United States Patent [19]

Lu et al.

[11] Patent Number: 4,874,195
[45] Date of Patent: Oct. 17, 1989

[54] ANTI-GLARE SHIELD FOR THE FRONT WINDSHIELD OF CARS

[76] Inventors: Chih-Hsiung Lu, 4th Fl, No. 5, Lane 306, Kung Kuan Rd., Peitou, Taipei, Taiwan; Jill H. Lu, 907 Manley Dr., San Gabriel, Calif. 91776

[21] Appl. No.: 219,728

[22] Filed: Jul. 5, 1988

[51] Int. Cl.$^4$ .................................................. B60J 3/02
[52] U.S. Cl. .................................. 296/97.4; 296/97.2; 296/97.11
[58] Field of Search ............... 296/97.1, 97.2, 97.4, 296/97.8, 97.9, 97.11, 97.12

[56] References Cited

U.S. PATENT DOCUMENTS

| 1,567,480 | 12/1925 | Wood | 296/97.11 |
|---|---|---|---|
| 1,606,094 | 11/1926 | Myers | 296/97.2 |
| 1,913,277 | 6/1933 | Hoople | 296/97.9 X |
| 1,995,969 | 3/1935 | Donnelly | 296/97.11 |
| 2,013,560 | 9/1935 | Hacker | 296/97.4 |
| 3,372,953 | 3/1968 | Weaver | 296/97.11 |
| 4,674,789 | 6/1987 | Watjer et al. | 296/97.1 |

FOREIGN PATENT DOCUMENTS

| 2635535 | 3/1977 | Fed. Rep. of Germany | 296/97.4 |
|---|---|---|---|
| 164810 | 10/1982 | Japan | 296/97.11 |
| 125917 | 6/1986 | Japan | 296/97.4 |
| 166110 | 7/1987 | Japan | 296/97.4 |
| 175215 | 7/1987 | Japan | 296/97.4 |

Primary Examiner—Johnny D. Cherry
Assistant Examiner—Frank H. Willams, Jr.

[57] ABSTRACT

According to my research nearly all the glare problems produced by on-coming cars can be solved by using an anti-glare glass as small as an adult's fist with approximately only 4% transmittance to visible light. It is suspended transversely on a transparent frame secured to the ceiling by a support brace, on which there is a universal joint at each end, just above the windshield in front of driver's seat. The anti-glare glass each time will slide down automatically about 10 cm on the suspension frame by rotating a DC motor when a photocell is activated by an on-coming glare and will retract up automatically by the above-mentioned motor when the glare is gone.

5 Claims, 1 Drawing Sheet

ANTI-GLARE SHIELD FOR THE FRONT WINDSHIELD OF CARS

BACKGROUND OF THE INVENTION

When driving at night, drivers often encounter glare problems from on-coming cars that are nearly directly in front of them (especially just at the moment before passing when the road is narrow and the on-coming car is using its high beams or it is raining). This makes the drivers very uncomfortable and can create temporary blindness jeopardizing safety. A special shield designed to solve those problems is necessary, but is not commercially available at present and that is why I have designed an automatic adjustable anti-glare shield to fit near the left side of the front windshield of left side driven cars (right side of right driven one).

SUMMARY OF THE INVENTION

It is a general object of the invention to obviate or minimize glare problems arising from on-coming cars at night enhancing driving safety and comfortability.

Another object of the invention is to introduce a commercially available anti-glare glass (in Taiwan), i.e., metal coated reflective glass, with only 4% transmittance to visible light, which will solve almost all of the on-coming glare problems without affecting safety at night even when only a small sized anti-glare glass is used.

It is a specific object of the invention to provide a useful anti-glare shield with simple structure and small size, which can be adjusted by each driver into the optimal position for his height and angle of vision, so it does not inerfere with the driver's field of vision in normal condition.

It is yet a further object of the invention to provide a useful car part, which may be easily manufactured and is of practical use and can be mounted easily, conventionally and optionally. But to my knowledge, it is not commercially available and used now.

DESCRIPTION OF THE PREFERRED EMBODIMENT

Figure 1:
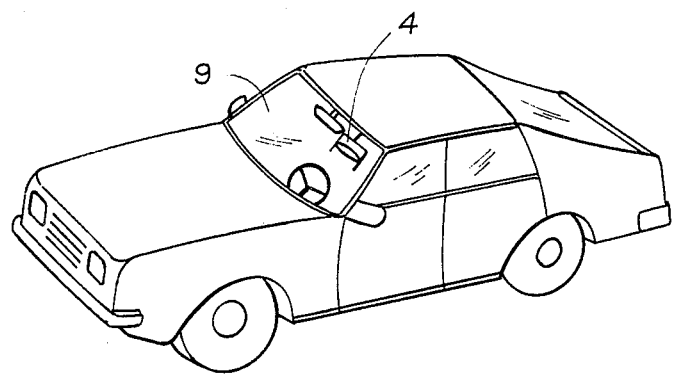
FIG. 1 An oblique frontal view of sedan showing the location of the anti-glare shield and its relationship to the driver's seat and steering wheel.
Figure 2:
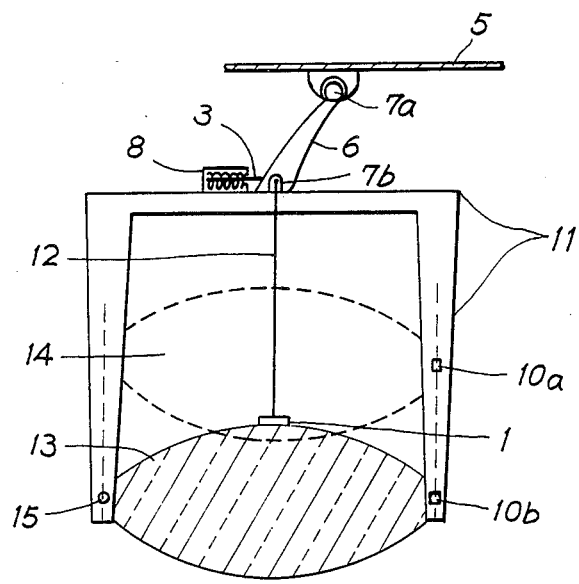
FIG. 2 A close up view of the anti-glare shield showing its external structures with the anti-glare glass in the down position (indicated by the solid lines) and in the up position (broken lines).

According to my research nearly all the glares produced by on-coming cars pass directly through a small fist sized oval shaped area of the front windshield in front of the driver, but to the left of his straight ahead line of vision (to the right in right side driven cars). Thus an anti-glare shield need not be large; a small adult's fist sized will do. Made of an approximately 6 mm thick piece of special anti-glare glass with the property of 4% transmittance to visible light, it will be suspended transversely on a transparent frame 11 (see FIG. 2) to be connected to the ceiling 5 by a supporting brace 6 with ball-and-socket joint 7a, 7b at each end just above the windshield 9 in front of the driver's seat (see FIG. 1) independent from and posterior to the sun visor, in such a way that the shield not only can be adjusted by each driver into the most optimal position for his height and angle of vision, but also can be moved out of the way in the daytime.

Because the glare problems encountered through the front windshield are so often abrupt and transient, the shield is designed to be controlled automatically. The automatic control system will use the same kind of mechanism (consisting of a photocell, sensitivity dial, on-off switch, DC motor, etc.) that the most recent models of Cadillac (General Motor Cooperation, U.S.A.) use to adjust their inside rear view mirrors. When the photocell 15, installed at the lower part of the suspension frame 11 (see FIG. 2) near the previously mentioned small adult's fist sized area on the front windshield 9, is activated by an on-coming glare the DC motor 8, its shaft 3 connected to the upper edge 2 of the anti-glare glass 13, 14 by a cable 12 (see FIG. 2), will turn on and rotate causing the anti-glare glass 14 of the shield to slide downward automatically on the suspension frame 11 (see FIG. 2). When the glare is gone, and anti-glare glass 13 will retract automatically out of sight on the suspension frame 11 (see FIG. 2) to prevent interference with the driver's field of vision. The anti-glare glass 13, 14 each time will slide up or down about 10 cm, stopping when the edge of the glass makes contact with the upper or the lower microswitch 10a, 10b on the suspension frame 11 (see FIG. 2) thus shutting off the DC motor 8.

Under certain conditions, drivers may want to keep the anti-glare glass in the down position 13 for an extended period, such as in downtown driving to prevent the anti-glare glass from moving up and down too frequently distracting the driver. Likewise, for safety purposes, when driving near intersections and just before turning it may be best to leave the anti-glare glass in the up position 14 even when on-coming glare is present. Therefore, it is important to have an on-off switch installed near the dashboard for easy manipulation to turn off the automatic control system when needed. This accommodation is new and improves upon the design used on the most recent models of Cadillac automatic inside rear view mirrors.

Based on my experience and research, a small sized good quality anti-glare glass (with approximately 4% transmittance to visible light) combined with a well designed control system can solve almost all of the on-coming glare problems without affecting safety. Besides being very useful and practical, its small size does not interfere with the driver's field of vision. The remaining minimal unsolved on-coming glare problems can be overcame by slight tilting or turning of the driver's head. Although the previous mentioned anti-glare glass with the property of approximately 4% transmittance to visible light is presently not manufactured, it can be made easily by modifying the presently available metal coated solarflex reflective glass, produced by the Taiwan Glass Industrial Cooperation in Taipei, R.O.C. The additional decrease in visible light transmittance can be achieved by increasing the thickness of the special metal coating on one of the surfaces of the glass.

I claim:

1. An anti-glare shield for a front windshield of a car comprising: an anti-glare glass having a central portion of an upper edge of said glass suspendingly secured to a shaft of a DC motor by a cable, said glass having two side edges slidably engaged with a pair of transparent vertical frames disposed on two opposite sides of said glass, said glass suspended under said cable being generally perpendicular to said cable, said DC motor mounted on an upper portion of said transparent frames, a photocell installed on one of said pair of transparent frames for actuating said motor, so as to slide said anti-glare glass, and two microswitches installed on the other of said pair of transparent frames for stopping a running of said motor, thereby stopping a sliding movement of said anti-glare glass.

2. An anti-glare shield of a front windshield of a car according to claim 1, wherein said anti-glare glass has a 4% transmittance to visible light therethough and is 6 mm in thickness.

3. An anti-glare shield for a front windshield of a car according to claim 1, wherein said anti-glare glass is a metal coated reflective glass which is made by coating metals on a glass surface to form a homogeneous metal film on the glass surface.

4. An anti-glare shield for a front windshield of a car according to claim 1, wherein said anti-glare glass, normally lying in upper position, slides down automatically only approximately for 10 cm along said transparent frames whenever said photocell is activated by an oncoming glare and then rises automatically to its original upper position when the glare is extinguished.

5. An anti-glare shield for a front windshield of a car according to claim 1, wherein said anti-glare shield has a control circuit means including an on-off pushbutton near the dashboard for controlling said anti-glare glass to be positioned at an upper position or a lower position in response to any external driving environment or situation.

* * * * *